A. HOWLAND.
COMPOUNDING COLORS AND APPARATUS FOR SAME.
APPLICATION FILED JUNE 30, 1915.

Patented Dec. 20, 1921.

INVENTOR
ARTHUR HOWLAND

BY
Mitchell, Chadwick & Kent
ATTYS.

A. HOWLAND.
COMPOUNDING COLORS AND APPARATUS FOR SAME.
APPLICATION FILED JUNE 30, 1915.

1,400,552.

Patented Dec. 20, 1921.
6 SHEETS—SHEET 2.

INVENTOR
ARTHUR HOWLAND
BY
Mitchell, Chadwick & Kent
ATTYS.

A. HOWLAND.
COMPOUNDING COLORS AND APPARATUS FOR SAME.
APPLICATION FILED JUNE 30, 1915.

1,400,552.

Patented Dec. 20, 1921.
6 SHEETS—SHEET 3.

INVENTOR
ARTHUR HOWLAND
BY
Mitchell, Chadwick & Kent
ATT'YS.

A. HOWLAND.
COMPOUNDING COLORS AND APPARATUS FOR SAME.
APPLICATION FILED JUNE 30, 1915.

1,400,552.

Patented Dec. 20, 1921.
6 SHEETS—SHEET 4.

INVENTOR
ARTHUR HOWLAND
BY Mitchell,
Chadwick
& Kent ATTYS.

A. HOWLAND.
COMPOUNDING COLORS AND APPARATUS FOR SAME.
APPLICATION FILED JUNE 30, 1915.

1,400,552.

Patented Dec. 20, 1921.

INVENTOR
ARTHUR HOWLAND
BY Mitchell, Chadwick
+ Kent ATTYS.

A. HOWLAND.
COMPOUNDING COLORS AND APPARATUS FOR SAME.
APPLICATION FILED JUNE 30, 1915.

1,400,552.

Patented Dec. 20, 1921.

INVENTOR
ARTHUR HOWLAND
BY
Mitchell, Chadwick & Kent
ATT'YS.

UNITED STATES PATENT OFFICE.

ARTHUR HOWLAND, OF WEST NEWTON, MASSACHUSETTS.

COMPOUNDING COLORS AND APPARATUS FOR SAME.

1,400,552.　　　　Specification of Letters Patent.　　Patented Dec. 20, 1921.

Application filed June 30, 1915. Serial No. 37,359.

*To all whom it may concern:*

Be it known that I, ARTHUR HOWLAND, a citizen of the United States, residing at West Newton, in the county of Middlesex and State of Massachusetts, have invented new and useful Improvements in Compounding Colors and Apparatus for Same, of which the following is a specification.

This invention relates to improvements in the art of charting and compounding colors, especially colors of pigments and other material substances by which color effects are obtained. It has heretofore been discovered that every color has three characteristics, referred to herein as hue, strength and luminosity, and that the three together define any color completely. It has also been proposed to provide a definite and intelligible color notation by arranging colors on a chart or charts and naming each color whose prototype appears on the chart according to the notation that defines its position thereon. Colors have been thus charted in gradations with the idea of providing definite standards or monuments, as it were, by comparison with which the place of any color in the system may be learned. So far as I am aware, no comprehensive chart or arrangement of colors has heretofore existed in which the color corresponding to any given point in the system could be determined or identified as such, except by comparison with the specimen color which the maker of the chart has assigned as the prototype or standard for that particular point. Furthermore, no chart has been so conceived and arranged that an error or variation in such a standard specimen, or prototype, could be discovered and its error or variation, if any, determined. No chart has been so arranged that the color corresponding to a given point for which there is no prototype could be made or identified with precision, except by comparison with the immediately adjacent colors on the chart. No chart has been so arranged that the color, corresponding to a given point on the chart for which there is no prototype, could be made or identified with precision by compounding other colors remote from it on the chart, in such a way that persons working independently would reach an identical result, or the same person working on different occasions with different ingredients would produce an identical result. It is a purpose of the present invention to provide such charts and a method by which they can be made; to make them so that a specific position thereon, and the pertinent notation, can be determined for any specific color, whether that color be previously known or unknown; also to provide so that the selection and precise proportions of remote ingredients for compounding the color denoted by any position thereon may be predetermined by the aid of the chart. It is another object of the invention to provide means by which such predetermination can be made by the use of straight lines on the chart, or by simple arithmetical processes; and to do this with colors positioned in all parts of the color universe (including the neutral grays, which herein are treated as "colors"), regardless of whether the straight lines joining them fall within any existing chart, or not.

Inasmuch as the known range of materials, such as pigments, which are capable of retaining their qualities of hue, strength and luminosity unchanged for considerable periods of time, is limited; and inasmuch as the known pigments vary at different rates and in different qualities depending upon their chemical constitution, and the various effects of heat, light, oxygen, etc., upon them, it is a further object of the invention to provide means by which the accuracy of the colors existing upon or identified by reference to any particular chart may be tested and their qualities or positions relocated; and to this end it is another object of the invention to provide a system of charts such that the qualities of hue, strength and luminosity which pertain to each point on the charts may be produced by compounds of remote colors of known standard quality, or by a variety of such compounds; and to do this with a high degree of accuracy, accuracy so great in fact that the variation of a synthetic color thus formed from a true standard of the given notation of hue, strength and luminosity is so slight as to be not detectable by the eye of a trained observer. Another feature involved in the invention is the use of an improved standard of black, viz., the black of a space or vista from which light is excluded, in comparison with which the cards and pigments heretofore used as standards of black are distinctly luminous and are not neutral in hue. Other features are the provision of a method of expressing relations of pigment colors to spectral colors, so that standards for pigments may be selected which are definable accurately for all time, and can at any time be corrected or tested to discover whether the physical specimens employed as standard have suffered variation in their color qualities with lapse of time; and the provision of a system by which nearly all possible colors can be made from a very few working standards; and in general the provision of the other advantages that characterize the invention herein disclosed.

It will be understood that the invention deals, in the main, with the practical problem of colors emanating by reflected light from pigments, dyes, inks, natural objects, etc., such as are used or dealt with in the industrial arts and the fine arts; but the method and charts of the invention appear to be applicable to other uses; and it is believed that they will be found of great value in other fields, such as in educational work, and in the making, study and classification of colors, color effects, color combinations, and colored light in general, in a way which has not been possible hitherto.

These objects are accomplished by means hereinafter set forth in detail or by equivalent methods, for many variations of the precise procedure herein described may be practised within the field that has been laid open by my discovery, and many of the benefits of the invention may be had by the use of parts without the whole, or without using it in the particular form which I here illustrate, and consider best. It is intended to cover by suitable expression in the appended claims whatever features of patentable novelty exist in the invention disclosed.

Figure 12:
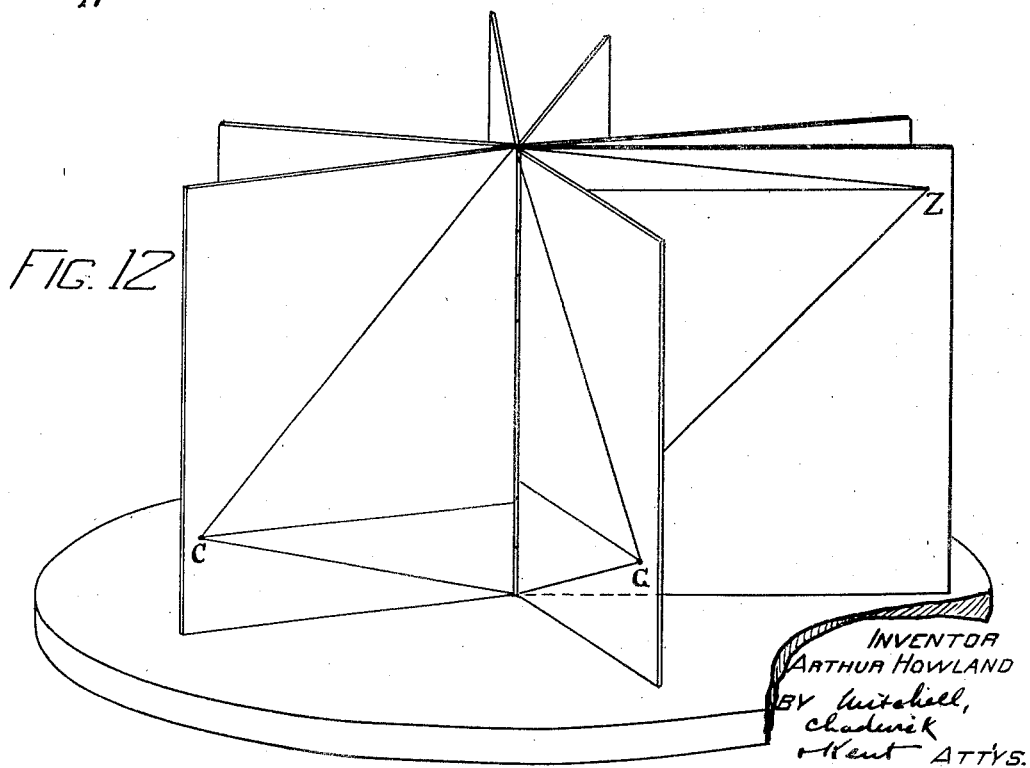
Fig. 12 represents another style of chart or structure made in three dimensions for showing in their true relations selected points in any parts of the color universe.

To understand the process of the invention for compounding colors, one may conceive of the color universe as a mass containing all colors, each point in the mass having a color differing from that of every other point therein. The lowest point of the mass is absolute black. From that a succession of neutral grays extends vertically upward, in a line rising through the midst of the mass to the highest point, which is perfect white. This line expresses the whole range and scale of luminosity. All colors that agree with each other in luminosity, although various in hue and in strength, are located in some single horizontal plane whose position is expressed by the elevation of the point where that plane cuts horizontally through the vertical scale of luminosity. All the colors that agree with each other in hue, although differing from each other in luminosity or strength, are situated in some single direction from said neutral axis, i. e., in a vertical plane passing through it. The various hues are considered as being arranged in successive planes standing in angular progression around said neutral line as an axis or pole, somewhat as indicated in Fig. 12. All colors that agree with each other in strength, although various in hue and luminosity, are equi-distant from the neutral line. The distance of any point from the neutral line is an expression of its strength of color. according to the scale of the chart on which it appears. It is not essential that the neutral axis be arranged vertically, but as the vertical conception is convenient and tends to brevity and clearness in describing the relations of points and scales to each other it will be used herein, although it must be understood that it is really immaterial in what directions the neutral axis and the other lines and planes extend, the only important thing being their relations to each other.

Figure 1:
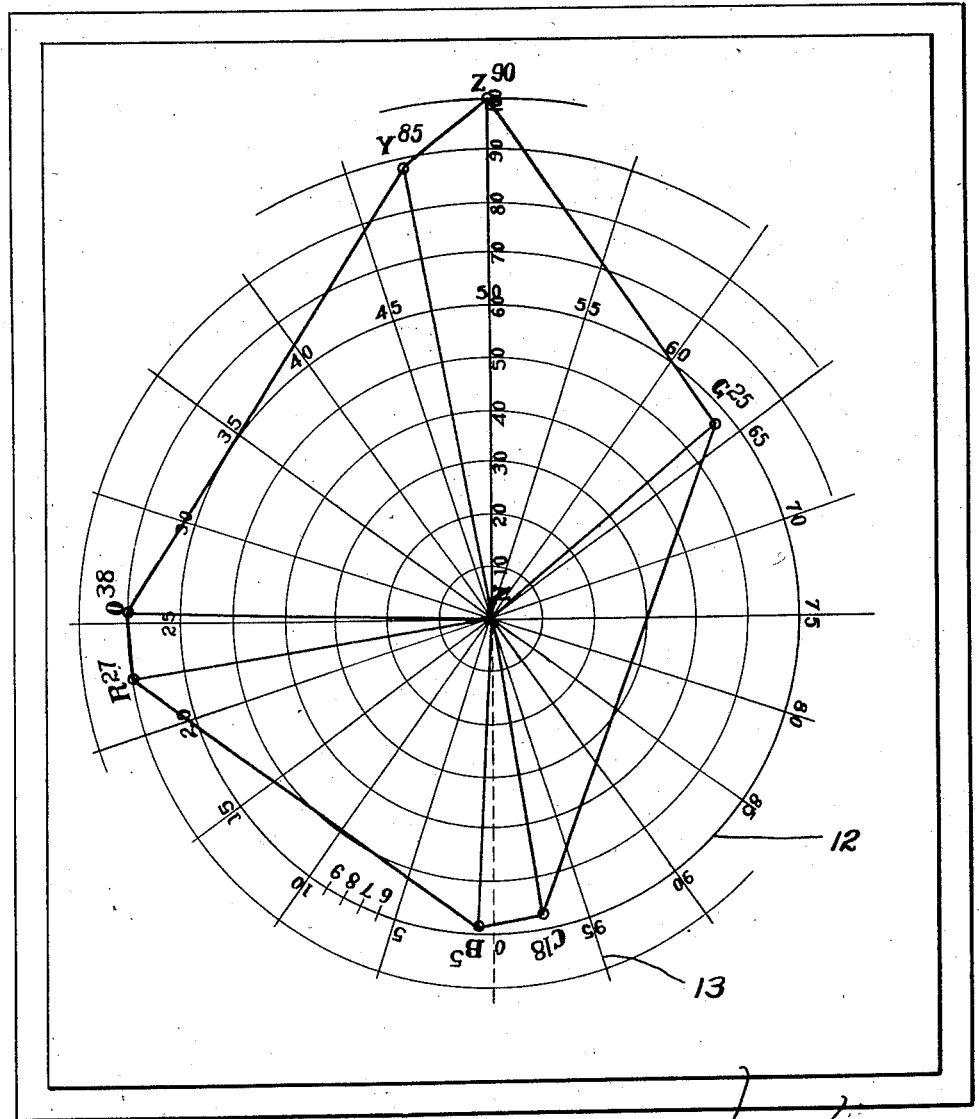
Figure 1 represents a chart herein referred to as a "horizontal chart," representing a projection of points in the color universe upon a horizontal plane, as the same may be charted for practising the invention.

With this conception in mind, as more fully set forth hereinafter, the objects of the present invention may be accomplished with the aid of a single chart, which may be called a "horizontal chart," of which Fig. 1 is an example, graphically showing the relations which any color points bear to each other in hue and strength, and by numerals indicating their luminosities. This is called a horizontal chart because it is a projection upon a horizontal plane. It may show any points in the color universe, whichever points it may be desired to consider and to represent. As it is based on the assumption that the scale of luminosity extends vertically, the extent of that scale is not seen; and its location only is represented by the single point N which therefore represents a neutral gray of indeterminate luminosity. For the same reason the luminosity of any point on the chart is indeterminate from the position of the point, and is indicated by figures written beside the point. Another chart, illustrated in Fig. 2, may be used to show relations of strength and luminosity graphically. This is called a "vertical chart" because it can show any vertical plane, being parallel to the vertical scale of luminosity and neutral axis. This chart is made on the assumption that all of the planes passing through that axis have with their colors been rotated around the vertical neutral axis into a common plane which is the plane represented. For practising the invention these charts do not need to have colors upon them. Standard specimens of a few colors are provided, preferably in the form of Maxwell disks (Fig. 7), or disks from which sectors are excised (Fig. 8), so that they can be combined with the standard black of space, with the aid of a photometer (Fig. 9) by me described in my co-pending application for patent Serial No. 834,573. These disk colors may be few in number, say five or six, in addition to white and black (which are herein for convenience treated as colors), but preferably they are possessed of great strength individually, and are of well separated hues. Their positions should be marked on the horizontal chart, and their respective luminosities should be noted thereon or shown graphically by their positions on a coöperating vertical chart. In the drawings the positions of one such set of points representing working colors which may thus be used are marked on the charts, Figs. 1 and 2; and they are individually designated by convenient initial letters, W (white), Bl (black), R (red), O (orange), Y (yellow), Z (zinc yellow), G (green), C (cobalt blue), and B (blue). Straight lines joining their projected positions on the horizontal chart will make a polygon inclosing the projections of nearly all colors. Any color whose point is within the luminosity limits, and whose projection upon the horizontal chart falls within the polygon, can be made by proper combinations of these working colors, in accordance with the method now to be described.

The points representing these working colors are accompanied in the drawing (Fig. 1) by the scales or notation indicating their respective positions, thus signifying their individual specific color qualities. This will be understood by remembering that the luminosity of a color measured on this new method is directly proportional to the elevation of the point having that color above zero luminosity, which is expressed by its percentage of the elevation of white; that the strength of the color is expressed by the distance of its point from the neutral axis; and that its hue is expressed by the position of the point according to angular measurement around the said axis, preferably stated in percentage of distance around the circle from some arbitrarily assumed zero point which I believe is most convenient when located in the region of purple blue directly opposite the yellow of highest luminosity, which point may also be assumed arbitrarily as being 100 per cent. on the scale of strength. This notation may commonly be written in the order: hue, strength, luminosity. Thus, the notation of the zinc yellow point Z of the drawings would be 50—100—90.

The working colors chosen for purposes of illustration are actual pigments, each selected as being one of the strongest colors of its own particular sort of hue. From their positions as marked on the horizontal and vertical charts it will be seen that they differ greatly from each other in luminosity.

The process of making a desired color according to the invention will now be explained; and afterward the way of constructing charts that may be used in the process. The color of any point on the chart may be made by compounding a pair of other colors, in proportions shown by the charts. Such a compounded color will herein for brevity be referred to as a "resultant" color; and the pair as its "ingredient" colors. An infinite number of such pairs exist for making any particular resultant color; and as either of the ingredient colors of any such pair may be itself the resultant of another pair of ingredients, or of any one of an infinity of other pairs, it will be seen that there is in a very true sense an infinitude of options as to the ingredient colors that may be chosen for making any particular color. In practice it is most convenient to select a pair of ingredients which one has at hand in the form of disks ready for spinning, or, as is usually necessary, if one has disks of only five or six colors, to select a pair of ingredients one of which is such a ready disk and the other of which is a color that can easily be made as a resultant by a combination of such ready disks. The rule to be applied is very simple: The point representing the desired resultant color being on the straight line joining the two points representing the pair of ingredient colors, the resultant is made by spinning together the two ingredient colors in quantities inversely proportional to their respective distances from said resultant color point. In other words, the product of the spinning area of one ingredient color multiplied by the distance of the other ingredient of the pair from the resultant color point equals the product of the spinning area of that other ingredient color multiplied by the distance of the first ingredient from said resultant color point. Or, shortened, spin together area of ingredient colors which are inversely proportional to their distances from the resultant color. If either of the ingredient colors is not at hand in form for spinning, the resultant can nevertheless be made by treating the missing ingredient as a resultant, and using its ingredients instead of the color itself in the spinning, those ingredients being determined by the same rule as to color and quantity; and either of those ingredients may likewise be a virtual resultant of other ingredients according to the same formula, the length of the straight line from the resultant point to one of its ingredients being always the reciprocal of the required area of its other ingredient. The charts of the invention are constructed in harmony with an assumed arrangement of the color universe to which the foregoing rule will apply. It is of course understood that there is no such thing as a color universe in material form or substance, and that the references to such a universe herein are only a device or graphical representation to help one understand the process of compounding colors according to the laws which the colors do in fact follow; but I believe that the conception of color relations herein set forth is new; and that the charts herein described, by which a great advance has been made in the art of compounding and dealing with colors, are more readily understood by assuming some such arrangement to exist. Charts may be constructed to show sections through such a color universe, or projections of it, or even in solid form occupying three dimensions of space to represent the color universe itself. Such charts show the relations of various points in it to each other or to the solar spectrum; and are preferably arranged and used with scales for facilitating the necessary computations.

The process of compounding is carried out best with the aid of a chart, by which the particular colors and the amounts of each are ascertained, and with the aid of any suitable apparatus for spinning together, and thus mixing, the color materials thus selected. The colors may be on separate sheets of material such as Maxwell disks. These are identifiable with the point whose color they represent by suitable notation written or printed on them. They are arranged suitably for spinning, with any desired proportion of any disk exposed or concealed, according to methods already understood in the art.

In the drawings, in Fig. 1, a plane platen 9 and sheet of paper 10 is portrayed on which is the "horizontal" chart. In the chart the position of the neutral axis representing the neutral color gray, is marked N and the positions of certain colors are marked B, R, O, Y, Z, G, C. The chart preferably is marked with scales. A series of faint line circles 12 about the point N, with radii varying at a uniform rate, shows the scale of strengths. One of these circles divided on a scale of 100 shows the scale of hues, to which any point is easily referred by the radial lines 13. As this chart does not show luminosity, a figure is written by any point to signify the elevation of the color point of which it is a projection, above the level of black or zero. This elevation is shown graphically in Fig. 2.

Figure 2:
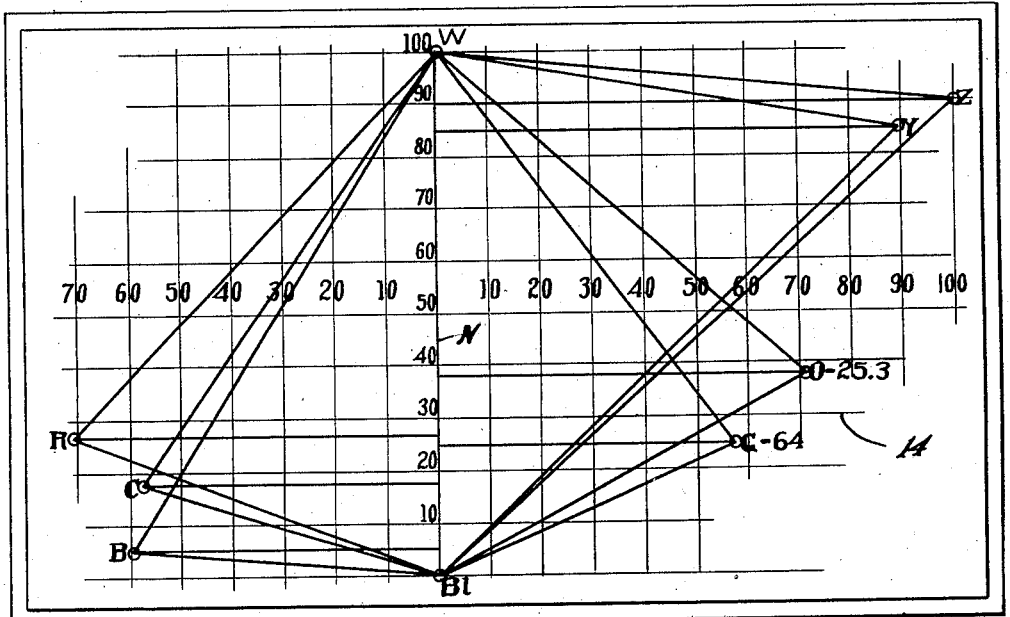
Fig. 2 represents another chart, herein called a "vertical chart," representing a vertical plane into which the points shown are represented as having been revolved around the neutral axis from their respective true positions in various planes of hues indicated in Fig. 1.
Figure 3:
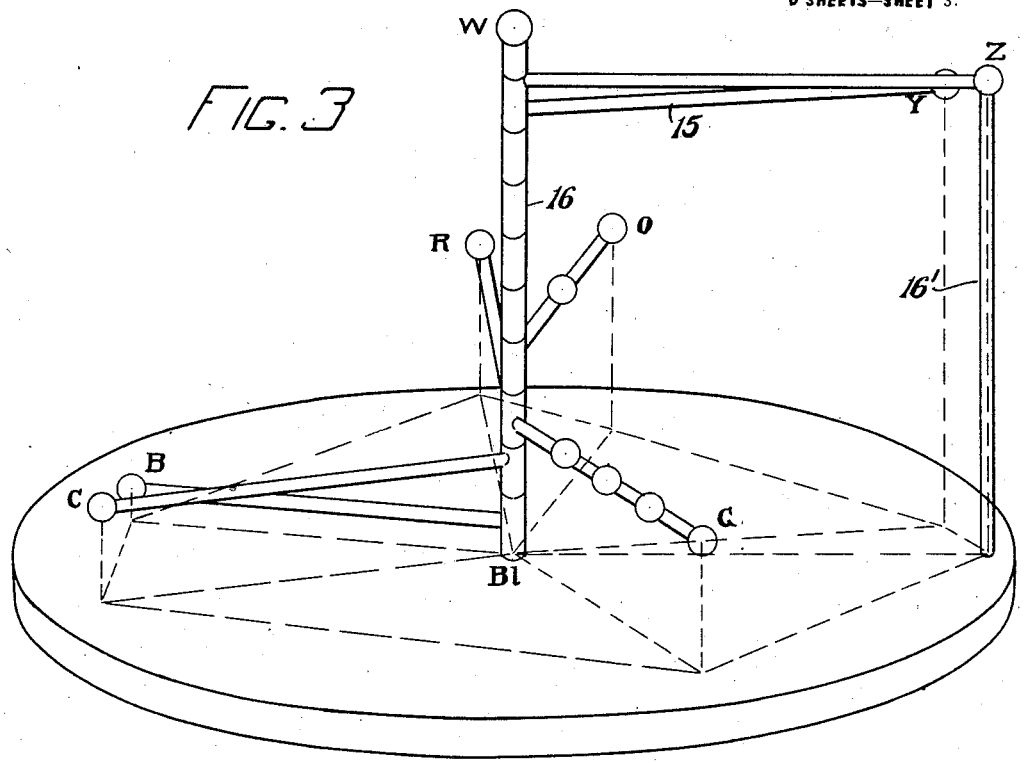
Fig. 3 represents a chart or structure made in three dimensions, for showing in their true relations selected points in any parts of the color universe.

In Fig. 2 is represented another sheet of paper 11 on which is a "vertical" chart. The neutral axis is the line marked N and the rotated positions are shown for the colors whose normal angular positions are seen in Fig. 1,—all on one side of the line 25—75, (Fig. 1) having been rotated around the axis N into the vertical plane through the line N—50 and all on the other side rotated into the vertical plane continuous therewith through line N—O. The distance from black to white is divided on a scale of percentages constituting the scale of luminosity, light horizontal lines 14 being prolonged from the divisions of the scale for easy reference. The scale of strength appears on this chart in the form of light vertical lines. As this chart does not show hue, hue may be indicated by a numeral beside the point representing the color, the numeral indicating the percentage of distance around the circle from the zero point marked in Fig. 1 to the plane wherein the point lies, as G—64.
Fig. 3 is an isometric view of a chart made in three dimensions, thus showing hue, strength and luminosity in a single chart. This is not so well adapted for practical use in making computations because it is not a plane; but it has the advantage of showing visibly the relations of the different color positions to each other, and of the colors themselves if the points be colored. The various color points are represented by knobs fast on stiff straight wires 15 each of which extends horizontally from a vertical post 16 which, rising from black to white, may be colored in gradations of gray according to the principle hereinafter defined, and represents the neutral axis N. Ordinarily, such a chart being made merely for visual representation of locations of colors, would have many more than those portrayed, knobs of the specific color being supported at the position of the color by any suitable means such as the radial horizontal rods 15 or vertical rods 16' supported on the base. The scales of hues and of strength may be marked on the base, and the scale of luminosity on the post 16. Dotted lines in Fig. 3 show projections and the horizontal chart.

Figure 6:
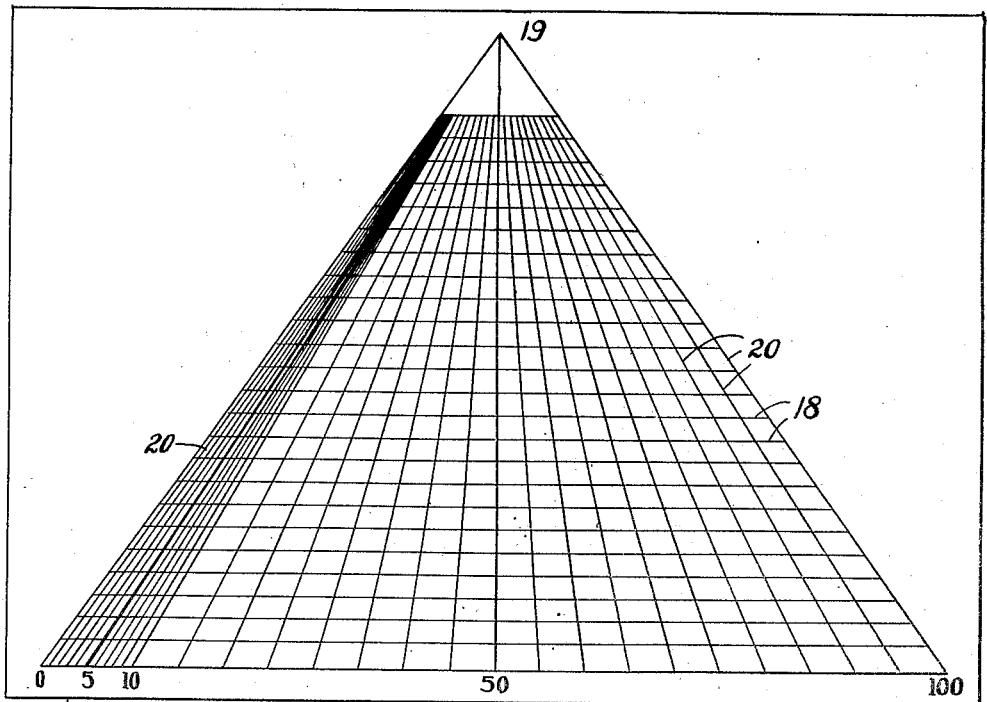
Fig. 6 is a chart with percentage scale used in combination with the other charts of the invention.

In Fig. 6 is represented a chart on a sheet of paper 17 consisting of a set of parallel lines 18 divided on a scale of percentage, through the division points of which straight lines 20 converge to a point 19. The converging lines are intersected by any convenient number of other lines parallel to the line 18. The parallel lines vary in length from a minimum near zero up to the greatest length that may be measured on the horizontal or vertical charts. One of them can therefore be found, or the position of one, if not actually present, which is equal in length to any distance between two points on those charts, say between a pair of ingredient points. By referring that length and the position of the resultant point thereon to the parallel line having the same length on the chart of Fig. 6, the percentage of said distance which lies on either side of said resultant point can be read directly from the chart of Fig. 6.

Figure 7:
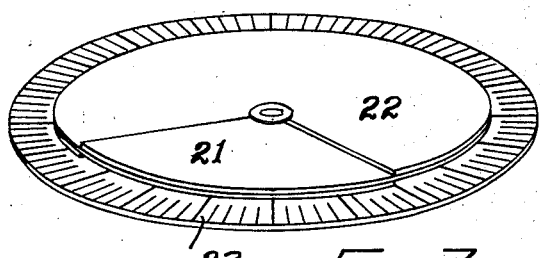
Fig. 7 is a perspective of two disks, assembled for spinning, as used in making the color compounds, corresponding to the inner part of the diagram of Fig. 10.
Figure 8:
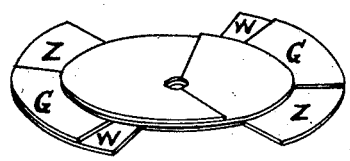
Fig. 8 is a perspective of several of such disks combined, ready for spinning to make a resultant color from virtual ingredients as deduced from use of the chart; corresponding to the outer part of the diagram of Fig. 11.

In Fig. 7 are shown two Maxwell disks 21, 22. According to the well known principle of such disks, they can be assembled with either one exposed to any desired extent, the remainder of the circle being made of the other. With this is a circular scale 23 by which the percentage of either is easily read.

Figure 4:
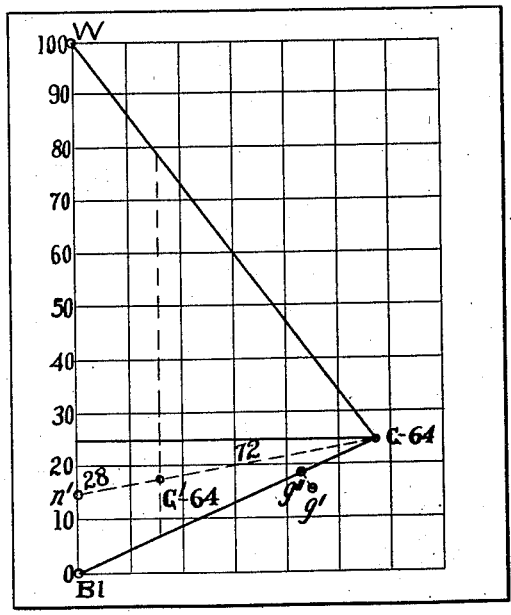
Fig. 4 represents a vertical chart with diagram showing its use for finding the ingredient colors which will make a resultant color, in a simple case.

For a simple example illustrating the practice of the invention, reference may be made to Fig. 4 which is a reproduction of part of the vertical chart of Fig. 2, showing white, black, color G and the point G' whose color is to be produced. In this instance the desired color is of the same hue (64) as G but differs from it in strength and in luminosity. It is to be produced from the W, Bl and G.

Figure 10:
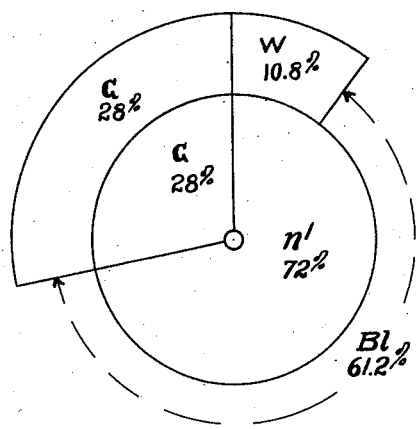
Figs. 10 and 11 are diagrams representing disks with sectors of various colors and various areas exposed.
Figure 11:
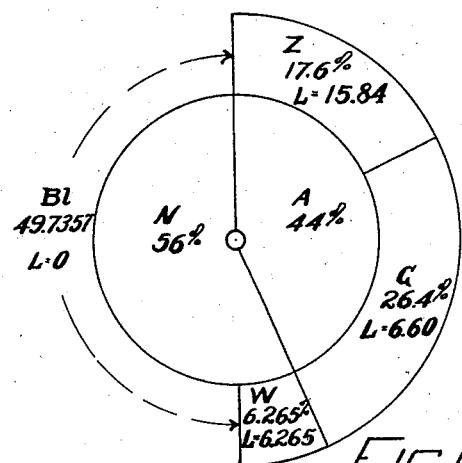

Assuming therefore, that G is one ingredient, one may draw a straight line on the chart from G through the resultant G' until it intersects the line joining W and Bl, which is the neutral line. This intersection is the point $n'$, which will be the other ingredient. The percentages into which the resultant G' divides the whole line G—$n'$ may then be determined, preferably by use of a chart like Fig. 6. Placing a straight edge of paper or other suitable material on the line G—$n'$, one may mark on the straight edge the distances of the points G, G', $n'$ from each other, and the straight edge may then be laid on the chart of percentages, Fig. 6, and slid along thereon parallel with the lines 18 until a position on that chart is found where the outside converging lines thereof register with the marks representing the points G and $n'$. Thereupon the percentages into which the intermediate point G' divides the whole line G—$n'$ can be read directly from the chart, giving the exact proportionate area of the ingredient G (green) and of the ingredient $n'$ (neutral gray) whose mixture will produce the desired resultant G'. In the case assumed for illustration the percentages are found to be 28 and 72. If a disk of the color $n'$ be at hand it can be used, with 72 per cent. exposed, combined with 28 per cent. of G, as shown in Fig. 7 and diagrammatically in the inner part of Fig. 10; but if not the color $n'$ may be treated as a virtual ingredient, represented in the mixture by two other colors W and Bl which are ingredients that will make it. In practice, this latter course would ordinarily be adopted because from the two colors W and Bl any point in the line joining them, whether $n'$ or other, can be made, resulting in producing G' or any other point in the dotted line (Fig. 4) running vertically through G'; and as any one of this infinite number of points is liable to be wanted for use it is not economical to attempt to maintain a supply of the colors of the various points, but rather it is better to make each color virtually as wanted. In the present case therefore, the neutral gray color $n'$ is to be made virtually by mixture of W and Bl. As the line W—Bl happens to be divided into percentages on the chart those percentages can be read directly and are found to be 15 and 85. Hence, to make the color G' disks are to be arranged in photometric apparatus, such as in Fig. 9, so that the sector covering 28 per cent. of the circle shows the color G, and the remaining 72 per cent. of the circle is either of the neutral color $n'$ or is of white and black in proportions which would produce that color when mixed, to wit, 15 per cent. of it white, (10.8 of the whole circle) and 85 per cent. of it black, (to wit, 61.2 per cent. of the whole circle). This composition is represented in the outer part of Fig. 10. Upon spinning, the mixture produces the color G'.

The same problem may be worked out by horizontal chart with the aid of simple arithmetic, without referring to the vertical chart. This is due to the fact that the horizontal projections of the two parts of the line G—n' are to each other in the same proportion as those parts of the line itself are to each other. To produce the color G' by this method one first finds the percentages, 28 and 72 into which that point divides the line G—N. Mixing any neutral color with G in these percentages will produce a color having the characteristic of G' in hue and strength, but there is only one chance in infinity that the neutral color selected will happen to be such luminosity as will produce the correct luminosity for G' because there are an infinite number of values of luminosity between zero and 100. Knowing that the luminosity of the desired color is 17.8 (which is the luminosity of the point G' as shown in Fig. 4) and observing that the color G which is to form 28 per cent. of the entire spinning mixture has a luminosity of 25, computation shows that the luminosity which this color G contributes to the total mixture, 28 per cent. of 25, is 7. This is because the luminosity would be 25 if the whole spinning face were of the color G. The remaining 72 per cent. of the circle must therefore add sufficient luminosity to this 7 (to wit, must add 10.8) to bring the total luminosity up to the desired 17.8. Hence, if an area of white equal to 10.8 per cent. of the whole circle be set in the 72 degrees sector, and if the remainder of that sector (to wit, 61.2 per cent. of the whole circle) be left vacant and consequently of zero luminosity, black, the total luminosity produced by the spinning will be 17.8 which, combined with the hue and strength obtained as above explained, produces exactly the required color.

With the three colors, W, Bl and G represented in Fig. 4, it is possible to produce any color within the triangle formed by the straight lines joining those colors, and not possible to produce from those ingredients any color outside of that triangle. However, by the use, for example, of a pigment of equal strength and lower luminosity than G, if such be at hand, colors below the line G—Bl can be made. And the utility of the invention is not limited to merely those colors which it is possible actually to make, and so to use by direct comparison. For example, a pigment whose color is g' located below said line can be identified and its position charted by spinning it with different quantities of white until the resultant g'' is on the line Bl—G, when the resultant g'' may be matched by a mixture of Bl and G and located. By prolonging a line from W through g'' a proper distance, according to the proportions of W and g' which produced g'', the point g' is properly located.

Figure 5:
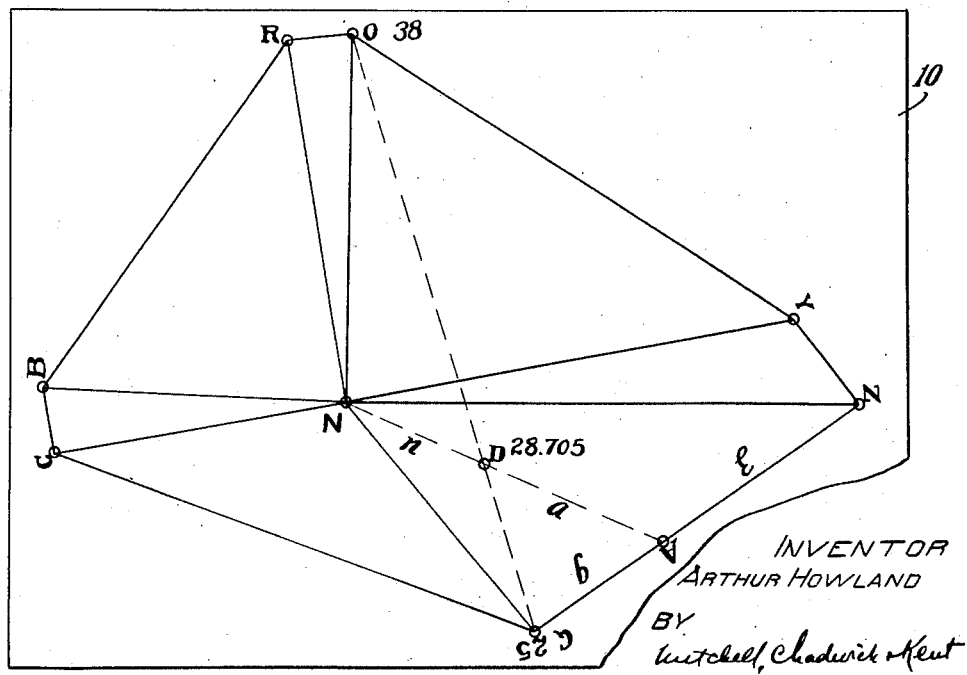
Fig. 5 represents a horizontal chart with diagram illustrating the practice of the invention by using the chart for finding the ingredients for making a resultant color, in the general case, where each ingredient differs from the resultant and from each other ingredient in hue, in strength and in luminosity.

For an example illustrating solution of the general problem of producing the color of any point, assumed to differ in hue, in luminosity and in strength from every color possessed by the operator in working form, reference may be made to Fig. 5 where the desired point is marked $D^{28.705}$. The general method of procedure is to draw a straight line on the horizontal chart from any convenient working color which the operator has at hand, such as from neutral N through D; and then to join any two other suitably positioned working colors which are available for use as ingredients, as Z and G, by a straight line which intersects the first line outside of D, as at the point A. The color D is produced by mixing A and N as virtual ingredients; they being virtual resultants of the actual ingredients Z, G, W and Bl. Having found the percentages which the parts $z$ (next to Z) and $g$ (next to G) respectively constitute of the whole line G—Z, and also the percentages the parts $n$ and $a$ constitute of the line N—A, one can then represent the making of the color A by formula as follows:

$n\%$ of $A+a\%$ of $N=100\%$ of D;
$g\%$ of $Z+z\%$ of $G=100\%$ of A;
$\therefore n\%$ of $(g\%$ of $Z+z\%$ of $G)+a\%$ of $N=100\%$ D.

In actual practice this is the method:

Let $g=40\%$ of G to Z ($z=60\%$);
Let $n=44\%$ of N to A ($a=56\%$).

Then, $$100\% \ D = \begin{cases} 44\% \ A, \text{ of which} \begin{cases} 40\%=17.6\% \ Z; \\ 60\%=26.4\% \ G; \end{cases} \\ 56\% \ N \ \ldots\ldots\ldots\ldots 56\% \ N \end{cases}$$

$$\overline{100\%} \qquad\qquad \overline{100\%}$$

It remains to find the ingredients of N which will produce the desired luminosity of 28.705 of D:

If Z has a luminosity of 90, and G has a luminosity of 25, the luminosity contributed by the different ingredients in spinning is:

| Area. | Luminosity. |
|---|---|
| 17.6% of Z= | 17.6×90=15.84 |
| 26.4% of G= | 26.4×25= 6.60 |
| 56.% of N= | 6.265 |
| 100% of D | 28.705 | the figure 6.265 being the amount which must be added to the luminosity by the other ingredients to give the product a luminosity of 28.705. This means the white to be added to the combination must be 6.265. The complete formula, therefore, is:

100% D=17.6% Z+26.4% G+6.265% W+49.735% Bl.

The requisite specific color $D^{28.705}$ is thus made from ingredient colors G, Z and W and Bl which are remote from each other. The same color might be made by an infinity of other combinations, for example by using Y instead of Z. Or some point on the line N—Z or on Z—Y or N—Y. For purposes of illustration the point D was chosen as on the line OG. As the chart shows that O has a luminosity of 38, and G of 25, and as by chart, Fig. 6, OD is to DG as 71.5 is to 28.5, a mixture of 71.5% of G with 28.5% of O would produce the color D, whose luminosity would be (71.5% of 25)+(28.5% of 38)=17.875+10.83=28.705.

The color $D^{28.705}$ is in fact a dull yellowish green, exactly the same in appearance when made by either of the methods above detailed.

Figure 9:
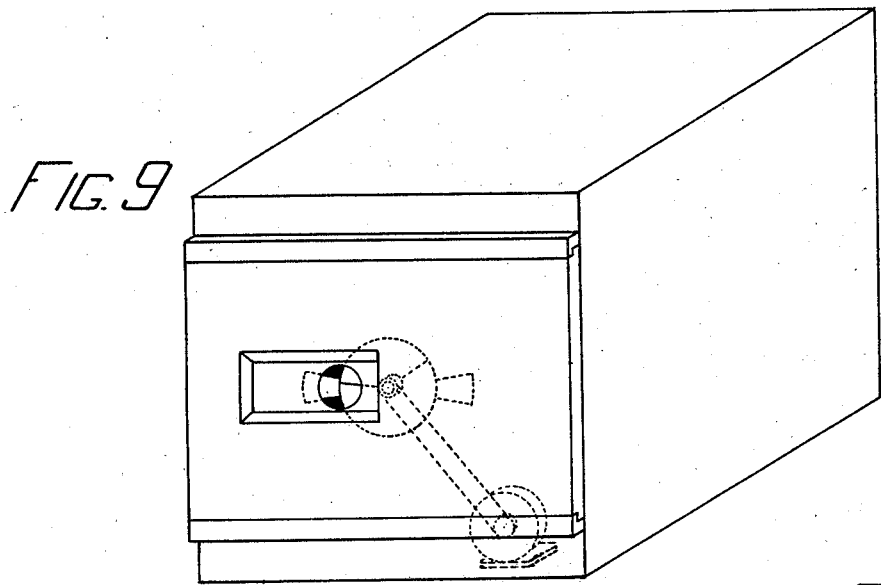
Fig. 9 is an insometric view of apparatus for spinning the disks and for introducing the standard black of the invention as an ingredient.

Having thus explained the practice of the invention on the assumption that the colors are properly arranged on the charts, it remains to show what that arrangement is. This important part of the discovery involves a novel arrangement or scale of colors according to luminosity, and the use of novel ideas in placing the colors with relation to each other as regards their strength and hue, and, in the case of hue, as regards their relations to spectral colors. So far as luminosity is concerned the invention involves an arrangement of colors according to a scale, increments of distance on which scale correspond directly with the increments of quantity of light emitted by a surface of standard luminosity when its area undergoes a change proportional to any said increment or distance. On a chart made in accordance with the present invention the scale of luminosity may be a line of any convenient definite length, may be divided into any suitable number of equal parts; and it is preferably arranged vertically as hereinbefore explained, its upper terminal point representing the perfect white of a surface having 100% of luminosity. Its lower terminal, or point of zero luminosity, represents the perfect black of space out of which no light comes to the eye, herein called the standard black. The location of any intervening point represents a luminosity equal to the observed luminosity of a mixture of the said standard white with the said standard black, in which mixture the ratio of white area to the total area of white-and-black is the same as the ratio of the elevation of said intervening point above zero to the total height of the scale. The mixture of white and black may be made by any suitable means, the best means known to me being by a photometer, the type of which is indicated in Fig. 9 and details of construction of which are shown in my application for patent Serial No. 834,573. In that instrument a standard black is provided, past which is spun a disk of standard white with excised sectors of any desired size. Through the excisions an appearance of absolute black reaches the eye. An appearance of perfect white comes to the eye from those parts of the disk which are not cut away. Hence during each complete revolution the observer's eye receives the impression of a white, precisely measurable in area of quantity, compounded with a black which is also precisely measurable in area or quantity. It is sufficient to know the angle of the excised sector or sectors; i. e., to know the proportionate relation of areas of white and black without actually measuring either. The mixture produces a neutral gray which is the resultant of the white and black considered as a pair of ingredient colors, as above explained. It is the color of a point on the line between white and black, at a distance from black proportional to the quantity of white in the mixture. Preferably this is expressed as a pecentage, measured from black or zero luminosity. Any and all of the grays in the line may be thus made and positioned. This produces a scale in which equal differences of luminosity correspond to equal distances on the scale.

It is particularly to be noted that this is not in accordance with appearances, and also that the present scale is really one of quantity or amount of light rather than a scale of values in the strict sense of the word. The difference between color "luminosity" herein referred to and color "value" may be understood by recalling that the latter term relates to the effect of the color upon the eye. This effect varies according to the law of sensation. Hitherto charts have been constructed by first determining the middle value between black and white with the aid of the concensus of opinion of persons having trained color judgment, as artists, buyers, salesmen, and students, and then equalizing the gradations of gray from that point to black and to white. Charts so made were superseded by charts made with the aid of a photometer, in accordance with the psychologic law of the relation between intensity of stimulation and sensation, commonly known as the law of sensation. Charts so constructed appear to give a correct expression of the value of pigments, and they are believed to do so, but they will not solve the problems of the present invention. The law of sensation being a law of squares, equal intervals on that scale (signifying equal differences of value), represent unequal differences in luminosity or quantity of white. In fact, on such a scale successive equal increments of value represent successively greater increments of white, increasing on an arithmetical progression. The diversity of such charts from the charts of the invention is manifest by observing that a pigment whose luminosity as measured by the photometer is of "middle value," or 50% on the former, falls at 25% on the charts of the invention; while a pigment having luminosity of 50% on a scale made according to the invention falls at about 71% on said scale of values arranged according to the law of sensation, assuming that the same standards of black and white are used for both.

Having thus defined the arrangement of neutral grays along the scale of luminosity, it remains only to add that the luminosity of every color is determined by comparison therewith, regardless of hue or strength.

Hues and strengths have peculiar interrelations, because of which it is possible to make an infinite number of charts with which the invention may be practised, in which the very same colors are differently positioned as respects hue and strength, as explained more fully hereinafter. A variation in position of one color is compensated by a complementary variation of position of the other. In my preferred arrangement the hues stand around the neutral axis in angular progression in the order of the hues in the normal solar spectum, equal increments of angular distance corresponding to equal variations of wave length. Some hues that may be represented on the chart, such as purple, are not seen in the prismatic spectrum, but I have found that there is a physical relation, and a more or less perfect analogy between the colors of pigments and the colors of a normal solar spectrum, if the latter be imagined wrapped around a cone with its ends overlapping each other, in which case purple is produced by the overlapping.

For the scale of hues I prefer to adopt as the zero point the hue of the color having lowest luminosity. This is in the region of purple blue, within the overlapped portion of the spectrum, and is opposite the point of highest luminosity, which is in the region of yellow. I find the zero point most conveniently by first locating the point of highest luminosity and marking it 50, and then taking the point directly opposite as zero.

For the scale of strength I adopt a percentage system with the neutral axis denominated zero and with the color of some pigment which is known to have great strength and which experience has shown to be apparently permanent in strength denominated 100%. In the drawings a certain yellow is illustrated as being so adopted. All other strengths may be expressed on this scale, even though exceeding 100%.

Scales of hue, strength and luminosity, having thus been chosen and adopted as standards, may be defined in permanent fashion by noting the relation thereto of selected phenomena of nature which are unchanging with lapse of time, e. g., the blackness of space, for the scale of luminosity; a definite ray of the normal solar spectrum, or the wave length of the hue at a specified point on the scale of hues; some certain pigment when freshly made from specified chemical ingredients for the scale of luminosity or of strength. Luminosity and strength, which are peculiar properties of pigments, in contrast to the variable light value and immeasurable purity of spectral rays, may be permanently definable by the last mentioned means. Any such perfectly reproducible pigment or ray may have its luminosity or strength or hue noted upon the standard scale of percentage, together with its name,—the method of producing it, or other identifying means. This fixes a point by which the same scale can be calibrated, or reproduced, at any time or place in future years. This feature is important, for the materials actually at hand for use as working colors may differ in different places, or may vary in color with lapse of time, and so may vary in position on the chart.

The working colors, which are mixed to make other colors, are preferably pigments having colors of great strength, various hues and various luminosities. They will not ordinarily be of uniform strength. Each is by nature nothing but an earthy composition or chemical compound selected because it happens to have been observed that it has some certain appearance of distinctive color. This differentiates the problem from work in spectral analysis, for the obtaining of a pigment having any particular light absorbing and reflecting qualities is purely fortuitous, both as respects hue and as respects strength. Also, it is always possible that substances may be discovered having color qualities not now known to exist in permanent form; also that the qualities of certain pigments may be found fugitive with lapse of time.

The impurity of the purest pigments is so great that the hues of the working colors cannot be conveniently placed on the chart with accuracy by the method of making detailed wave length mesurements. However, the following practical method gives a close approximation to a regular distribution of hues and to a proper setting of colors according to their relative strengths, and makes a chart that is suitable for use by the rule hereinbefore stated that mixture of any pair of ingredient colors will produce that particular resultant color which is on the straight line joining the ingredients and is at a distance from each ingredient proportional to the quantity of the other ingredients used in the mixing.

Figure 13:
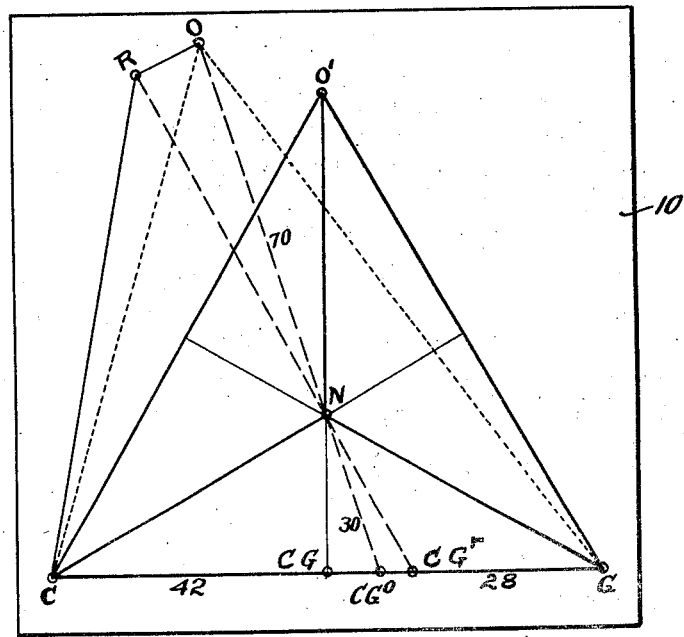
Fig. 13 is a diagram showing a method of constructing the chart.

Selecting three of the working colors whose positions are approximately at one-third of the circumference apart around the scale of hues, as for example, C (cobalt blue), G (Paris green) and O (orange), the C and the G may be marked wherever desired on the blank sheet of paper which is to constitute the chart, Fig. 13.

In order to place N, neutral gray, one may then imagine the existence of another color, O', so located on the chart that the three points C, G and O', constitute an equilateral triangle. The actual possession of the color O' is unnecessary for the construction of the chart; but I have obtained the color experimentally, in order to demonstrate that the assumption is true, by making successive mixtures of pigments until I have found one, O', which met the conditions that C, G and O' made neutral gray when spun together in equal areas. Under those circumstances the C and the G together balance the O'; the G and O' together balance the C; the O' and the C together balance the G. The neutral point N is where the line from O' to the point midway between C and G intersects the line from C to the point midway between G and O'; or where the line from G to the point midway between C and O' intersects the other two. Having now three positions, C, G, N, and the colors thereof, the working color O may be located on the chart after spinning it with C and G and varying the proportionate areas of these colors in the mixture experimentally until the result is observed to be neutral gray or N. The mixture may, for example, be found to be of O, 30%, C 28%, G 42%. As C and the G are colors that have already been marked on the chart; and as the O is neutralized or balanced by a color CG which is a virtual resultant made by mixing them as ingredients in the proportions of 28 to 42 of the color CG° which is the complement of O, is known to be on the line C—G at a point whose proportional distances from G and C are as 28 to 42. The point O may now be marked on the chart, because it is known that it lies upon the line running from CG through N and that CG° and O are distant from N in the proportions of 30 and 70 respectively, for the areas 28 and 42 which total 70 have balanced an area of 30 in the spinning, producing N as a resultant of mixture of the ingredient O with the (virtual) ingredient CG. Another working color, for example, R (red) may then be located on the chart by the same method, spinning R with C and G, finding the percentages of each which will combine to make neutral gray, finding the complement of R (CG$^r$) in the line C—G, setting of the distance (learned from the spinning) which R is beyond N on the line drawn from CG$^r$ through N. As the lines adjoining the points thus found surround the neutral point N, any other color which is at hand in form for spinning may be located on the chart by similar method.

Whether made according to the foregoing description or otherwise, the chart should be completed by noting the luminosities of the various points. This may be determined by comparing the colors directly with the scale of luminosities, or by using the color as an ingredient of a gray which may be compared directly with the standard gray, with smaller probability of error because the qualities of hue and strength are eliminated. When the luminosity has been determined, the vertical chart may be plotted. A proper estimation and combination of luminosities is an important element in achieving the notable results to which the invention points the way.

The chart thus made will show true relations of all colors whose positions are thus marked upon it, in such manner that any color whatever can be accurately charted and the color of any point within the scope of the chart can be made by mixture of other colors in proportions shown by the chart. It is only necessary to have working colors whose positions on the chart are known and to mix them, by spinning them together in proportions shown by the chart. Any color thus produced by a mixture can be produced by other and different mixtures, each of which serves to check the accuracy of the others. Any color so produced has a definite identifying notation shown by the chart; and the notation is capable of permanent standardization. Hence any color can be named with a permanent definitive notation, and can be produced from other colors, (if it be not outside of the limits incidental to the working colors at hand) with precision at any time or place in the future, without sample for comparison.

Strength and hue are interrelated in such a way that no charted measurement of strength is to be taken in an absolute sense. Strength of a color is always relative to the hue positions on the same chart.

It is possible to construct an infinite number of different charts, on which the charted positions of the very same colors vary, owing to variations in the distribution of hues around the circle, and in the relative rating of strength, every one of which charts is available for the said uses of the invention. I have found that charts in which none of the hues are excessively condensed together are the more accurate instruments for practising the invention, because the chance of errors in plotting lines and points thereon is less. For that reason, among others, I prefer the chart with the regular distribution of hues, with angular position varying according to wave length as above stated. This is particularly valuable for universal use; while a chart in which certain adjacent hues are more widely separated may be preferred for special purposes.

Figure 14:
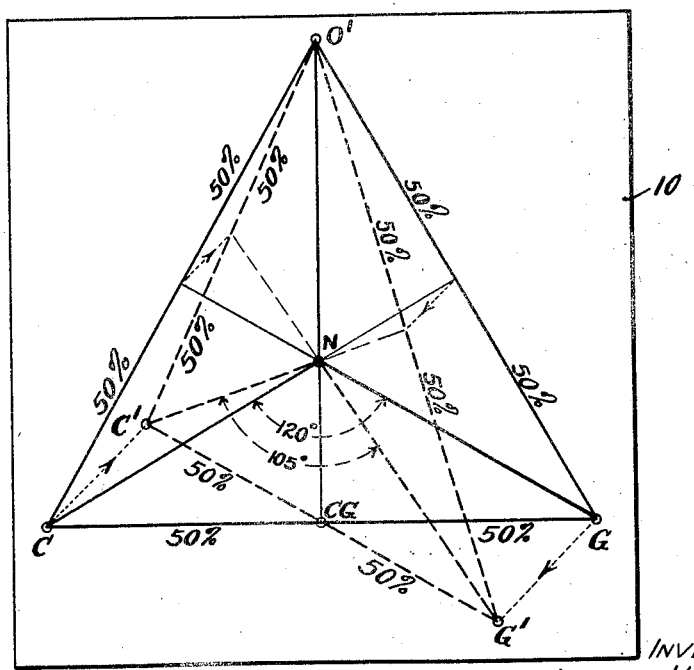
Fig. 14 is a diagram showing variant charting of identical colors.

The relation of one such chart to another, and the complementary relationship between the different hues and strengths which the same color appears to have on different charts, is indicated by Fig. 14 which is a diagram showing the same positions of C and G as in Fig. 13, where they are 120° apart, and also showing locations C' and G' which might represent precisely the same colors. These latter are only 105° apart, lie in different directions from the neutral N and have different relative strengths. The light dotted lines connect the locations of the same color in the two arrangements. On different charts, having the point N, CG and O' in the same places, colors C' and G' may be on any line passing through CG, provided that they are equidistant from CG so that when spun together in equal quantities they produce CG as a resultant, CG being the complement of O' and making neutral gray N when spun with it. Either C and G, or C' and G', wherever thus located, will neutralize O'; and from the assumed location of these points C', G', N, other points on the same chart can be found by spinning colors together. In the method of constructing a chart detailed above, it was assumed as a premise that the particular working color C, is distant 120° angularly from the particular color G, because these are two colors conveniently available for use under commercial conditions and because it is known that this angular difference is somewhere near that which would be found to exist if they were set on the scale of hues according to their wave lengths as above suggested. When the hues of C and G are set accurately by their wave lengths it may be found that the angle between them is somewhat different from that portrayed. In that case any point in the established direction of hue may be assumed as being C'; and,—N, C, and the angle CNG being known,—all the other colors G, O, R, etc., then take positions on the chart as determined by the observed proportions in which they must be present to make N when actually spun together.

The scale of strengths will be large or small according to the distance assumed for the point C' from N. The scale of luminosity will be large or small according to the distance assumed between black and white. In other words, the color universe may be conceived as having an infinite number of shapes, varying from each other by having a longer or shorter neutral line; or by colors of a certain strength being at different distances from the neutral line; or by colors of a certain hue being at a different angular distance from colors of another certain hue. In these matters dimensions and relations may be chosen as desired. For pursuing studies in luminosity it may be preferable to construct the chart with the scale of luminosity relatively long; for studying relative strengths of pigments one may prefer a short scale of luminosity but a long scale of strengths, thus producing a low and broad vertical chart; and for working with colors where slight differences of hue within a particular limited range of hues are to be charted a distortion of the regular distribution above described may be adopted, with greater spreading of the specified hues.

The charts shown herein, as for example, Fig. 1, give only a few points. When pigments of greatest strength have been found and have been located on all sides around the neutral gray the greatest possible number of other colors can be made. The distribution of hues around such a chart in its best form may be considered as if a band of the normal solar spectrum were wrapped around a circle, with its ends overlapping in such degree as will make a purple of maximum brilliancy in the region opposite yellow.

In the most precise conception the location of each color in the color universe is a mathematical point, and for accuracy that term is used in the foregoing specification; but as the claims refer to structures used in working the process of the invention the term "spot" is used as being its practical equivalent. A spot may physically embody and display its color, or it may be merely a spot which signifies specific color by its location. It will be understood therefore that in the claims the reference to a spot as "representing color" does not necessarily mean exhibiting or reproducing the color, but ordinarily refers to a representation of the color by the position of the spot. For practical purposes spots may vary in dimension between the pigment covered balls as illustrated in Fig. 3 and the closest practical approximation to a mathematical point; and such spots may be supported and maintained in their fixed relations to each other by any suitable means, either on wood or wire as in Fig. 3 or on paper or cardboard or other material. The term "quantity" is used in the claims in a proportional sense hereinbefore defined, and as applied to luminosity is to be distinguished from, and not measured by, the "value" or effect which it produces upon the human eye, but rather is determined by physical measurement of the quantity, proportion or constituent amount of white in a mixture of white and black of equivalent luminosity. It will further be understood that the "mixing" of colors referred to does not necessarily, nor ordinarily, mean a mixing of the materials having those colors, but rather a mixing of the colors or the color effects in the retina of the human eye under circumstances that allow each color to produce its full color effect, as by the well known spinning process or its equivalent, the "quantity" of each ingredient color in the mixture meaning the proportional time or area of the exposure of that color to vision during the spinning. In making such a mixture the ingredient color may be either actual or virtual, the latter term referring to any case in which one of the ingredients is present only by its own ingredients, which ingredients in turn may be present either actually or virtually by the substitution of their own ingredients. It is one of the features of marked utility in the invention that it is possible thus to make a color virtually, without making it actually, in order to use the color thus virtually made as an ingredient in another color actual or virtual. This enables a person who is in possession of a few selected colors of known quantities to make a very wide range of other colors.

I claim as my invention:

1. A multi-color iconograph comprising a structure in which various colors are represented by conventional indications and by the position of said indications; all of the said indications being positioned according to the same scales of luminosity, hue, and strength and being located at distances with respect to each other which, measured on the scale of luminosity, are directly proportional to the differences in quantities of white that are necessary in spinning black and white together to make those neutral grays which have luminosity equal to the luminosities of the compared colors.

2. An article representing qualitative relations of colors to each other, comprising a structure and spots thereon representing color: those of said spots whose colors differ in luminosity being arranged at directions and distances from each other which when projected upon a scale of luminosity are directly proportional to the differences in quantity of ingredient white in the grays respectively equaling them in luminosity.

3. An article representing qualitative relations of colors to each other comprising a structure and spots thereon whose positions represent constituent color qualities according to scales of luminosity and strength, measurements of distances between spots on each of said scales being directly proportional to the magnitudes of differences between the spot colors, in the particular color quality to which that scale relates.

4. An article representing the relations of diverse colors, comprising a structure and spots thereon whose positions represent constituent color qualities as measured on three scales; one of said scales being rectilinear, with distances along it directly proportional to differences in quantity of luminosity as measured by the quantity of ingredient white in a spinning mixture of white and black making gray of equal luminosity; another being a scale of angular measure around an axis, angular distances representing differences of hue, said axis running in the direction of said scale of luminosity and representing neutrality of hue; and the third of said scales extending radially from said neutral axis, differences in radial distance being directly proportional to differences of strength, the whole being arranged so that colors of spots when mixed as ingredients make the color of a spot on the straight line between them at a position such that the ratio of the distances from it to each of those two spots is the inverse of the ratio of the quantities of each spot color employed in the mixture.

5. An article representing relations of colors to each other comprising a base and spots arranged in a common plane thereon, in positions according to their respective color qualities, all being of common hue but located in positions along a rectilinear scale directly in proportion to their respective quantities of luminosity as measured by the quantity of ingredient white in a spinning mixture of white and black making gray of equal luminosity, and located in positions in a direction perpendicular to said scale directly in proportion to their respective strengths.

6. An article representing relations of colors to each other, comprising a base and spots of various hue, various luminosity and various strength arranged in a common plane thereon, around a center of neutral hue and strength with their angular positions according to their respective hues; their radii according to their respective strengths; there being represented, in particular hues, colors which are of approximately the greatest practicable strength in the particular hue; and conventional indications signifying the luminosity thereof.

7. An article representing relations of colors to each other comprising supporting means; and color spots arranged thereon in a plurality of planes, in positions according to their respective color qualities, one of said planes containing spots of various hues and strengths arranged around a center of neutral hue and strength, their angular distances apart measuring differences of hue, and their radial distances varying directly with their respective strengths; and another of said planes containing spots of common hue but diverse luminosities and strengths arranged according to a scale of luminosity extending perpendicularly to the first described plane, whereon distances are directly according to the differences in the quantity of luminosity, as measured by the quantity of ingredient white in a spinning mixture of white and black making gray of equal luminosity, the scale of strength being the same for both of said planes.

8. An article representing qualitative relations of colors to each other comprising a structure and spots thereon whose positions represent constituent color qualities according to scales of luminosity and strength, measurements of distances between spots on each of said scales being directly proportional to the magnitudes of differences between the spot colors, in the particular color quality to which that scale relates, the relative luminosities of spot colors being represented by distances which in each case accord directly with the quantity of ingredient white in a spinning mixture of white and black making gray of equal luminosity, and there being represented thereon colors of various hues at their proper position as to luminosity and strength and with conventional indications signifying their respective hues, combined with separately movable articles bearing specimens of the colors of said spots on said structure and adapted for their said specimen colors to be mixed in the retina.

9. An article representing qualitatives relations of colors to each other comprising a structure and spots thereon whose positions represent constituent color qualities according to scales of luminosity and strength, measurements of distances between spots on each of said scales being directly proportional to the magnitudes of differences between the spot colors, in the particular color quality to which that scale relates, combined with separately movable articles bearing specimens of the colors of said spots on said structure and adapted for their specimen colors to be mixed in the retina, there being represented thereon colors of various hues at their proper position as to luminosity and strength and with conventional indications signifying angular position around an axis, thereby designating their respective hues.

10. An article representing relations of colors to each other, comprising a base and spots of various hue, various luminosity and various strength arranged thereon in a common plane, around a center of neutral hue and strength with their angular positions according to their respective hues; their radii according to their respective strengths; combined with conventional indications signifying their luminosity; the said spots being arranged at unequal distances from said neutral center, said colors being of approximately maximum strength of their several hues to form corners of a polygon, colors of points within which can be formed by combinations of colors of non-adjacent corners thereof.

11. An apparatus to define colors and mixtures thereof to be made in the human retina by combinations of colors which are physically separate consisting of a chart representing relations of colors to each other, comprising a base and spots of various hue, various luminosity and various strength arranged thereon in a common plane, around a center of neutral hue and strength with their angular positions according to their respective hues; their radii according to their respective strengths, combined with marks signifying their luminosity; the said spots being arranged at unequal distances from said neutral center, said colors being of approximately maximum strength of their several hues to form corners of a polygon, colors of points within which can be formed by combinations of colors of non-adjacent corners thereof; and separate sheets having the colors of said spots and marks identifying them therewith, adapted to be manipulated to mix their colors in predetermined proportions.

12. An apparatus to define colors and mixtures thereof to be made in the human retina by combinations of colors which are physically separate consisting of a chart representing the relations of colors to each other comprising the combination of two charts and spots representing color on said two charts, being arranged on each in positions according to their respective color qualities, one of said charts containing spots of various hues and strengths arranged around a center of neutral hue and strength, their angular distances apart measuring differences of hue and their radial distances varying respectively with their different strengths; the other of said charts containing spots in positions representing various luminosities and strengths, the luminosities being measured by a rectilinear scale according to the quantity of ingredient white in a spinning mixture of white and black, making gray of equal luminosity; and the scale of strength being the same as for the other chart; conventional indications upon each chart identifying the position of spots thereon on the other chart; sheets, and means identifying them, showing the colors of said spots and adapted to be manipulated together to mix their colors in predetermined proportions.

13. An apparatus to define colors by their constituent qualities, thereby to determine the synthesis of a particular color from other colors of luminosity diverse therefrom, including, in combination, a chart with spots thereon whose positions thereon represent the qualitative relations of diverse colors to each other, said locations varying along a rectilinear scale in direct proportion to quantity of luminosity represented, as measured by the quantity of ingredient white in a spinning mixture of white and black making gray of equal luminosity; and separate sheets embodying severally the colors of certain of said spots, and adapted to be manipulated together to mix their colors in predetermined proportions.

14. An apparatus to define colors by their constituent qualities, thereby to determine the synthesis of a particular color from other colors of luminosity diverse therefrom, including, in combination, a chart with spots thereon whose positions thereon represent the qualitative relations of diverse colors to each other, said locations varying along a rectilinear scale in direct proportion to quantity of luminosity represented as measured by the quantity of ingredient white in a spinning mixture of white and black making gray of equal luminosity; and separate sheets embodying severally the colors of certain of said spots, and adapted to be manipulated together to mix their colors in predetermined proportions, there being conventional indications on the chart and on the said color sheets identifying the several color sheets with the spots to which they respectively pertain.

15. The art of making a color of predeterminate qualities from ingredient colors having luminosity diverse therefrom, including the plotting of a chart with spots whose locations represent the qualitative relations of diverse colors to each other, said locations varying along a rectilinear scale in direct proportion to quantity of luminosity represented as measured by the quantity of ingredient white in a spinning mixture of white and black making gray of equal luminosity; marking the single spot on said chart representing all of said predetermined qualities; marking two spots on the chart so located that the straight line joining them passes through the said single spot, and mixing together the colors of said two marked spots as ingredients, in quantities whose ratio to each other is the inverse of the ratio of the distances of their said spots from said single spot.

16. The art of making a color of predeterminate qualities from ingredient colors having luminosity diverse therefrom, including the plotting of a chart with spots whose locations represent the qualitative relations of diverse colors to each other, said locations varying along a rectilinear scale in direct proportion to quantity of luminosity represented as measured by the quantity of ingredient white in a spinning mixture of white and black making gray of equal luminosity; marking the single spot of the desired resultant color on said chart, at a location representing each of said predetermined qualities; marking two spots of ingredient colors on the chart, with locations such that the straight line joining them passes through said resultant spot, one of said two ingredient color spots being a composite ingredient and being the virtual resultant of other spots of ingredient colors similarly located with respect to it; combining together the primary ingredient colors thus determined in quantities whose relation is inversely proportional to the relation of the distances of their spots from their virtual resultant spot located as aforesaid on the line passing through them; adding to the combination the other of the first-mentioned ingredient colors, the total quantity of said colors composing the virtual resultant being the said composite ingredient and being treated as a single primary ingredient in making the first-mentioned resultant; and then mixing all the said primary ingredient colors, thereby producing the said desired resultant color without actually having its said composite ingredient.

17. The art of producing a predeterminate color including, as regards luminosity, the mixing of colors of different luminosity in quantities whose relation to each other is inversely proportional to the relation between the differences of luminosity of the respective ingredient colors from the predeterminate color, as measured by the quantity of white in a mixture of white and black producing the same luminosity by spinning.

18. The art of producing a predeterminate color, including the selection of colors of different qualities, as regards luminosity, hue and strength, and mixing them as ingredient colors in quantities inversely proportional to the differences between their respective luminosities, hues and strengths, and the luminosity, hue and strength of the desired resultant color, as shown on a chart where hues are arranged around an axis of luminosity with colors of equal strength at equal radial distances, and with points on the scale of luminosities positioned thereon at distances directly proportional to the quantities of white in the spinning mixtures of white and black that make the colors of such points, the said differences being measured rectilinearly between the points concerned.

19. Color apparatus comprising a structure having spots representing diverse hues and luminosity arranged upon it in such relations to each other that a mixture of the color of any spot with the color of any other spot produces the color of an intermediate spot on the straight line joining them, when the mixture is made with ingredient quantities of each, whose relation to each other is inversely proportional to the relation of the distances of each from said intermediate spot.

20. The art of making a color of predeterminate qualities from ingredient colors having luminosity diverse therefrom, including the plotting of a chart with spots whose locations represent the qualitative relations of diverse colors to each other, said locations varying along a rectilinear scale in direct proportion to quantity of luminosity represented as measured by the quantity of ingredient white in a spinning mixture of white and black making gray of equal luminosity; marking the single spot on said chart representing all of said predetermined qualities; marking two spots on the chart, one of which is neutral gray and the other of which is so located that the straight line joining them passes through the said single spot, and mixing together the colors of said two marked spots as ingredients, in quantities whose ratio to each other is the inverse of the ratio of the distances of their said spots from said single spot.

21. The art of representing color qualities consisting in arranging spots representing the colors in different positions with respect to and along an axis of definite length so that the position of each represents a specific combination of color qualities, points along a straight line joining any two of said color spots representing combination of color qualities differing from the combinations represented by said spots according to their proportionate distances therefrom.

22. A device representing the relations of colors to each other, comprising a body having a plane surface and having spots whose positions indicate hue and strength, free from any component luminosity, said positions representing indeterminate luminosity, and figures beside the spots indicating percentage of the luminosity of standard white.

23. The art of color synthesis from a plurality of ingredients differing in hue from the color which is to be made, comprising the associating and spinning of said ingredients together, with a space left between them wherein is a vista from which approximately no light reaches the eye, whereby ingredients having a higher luminosity and diverse hue may be used in a desired synthetic color of lower luminosity.

24. The art of making a color of required luminosity from ingredients having different luminosity, comprising the representation of the color qualities of the ingredient colors by positioning spots representing them on a plane chart according to their respective hues and strength; spinning together ingredient colors in quantities inversely proportional to their distances from the resultant spot representing the desired color on the straight line joining them, one of said ingredients being neutral; finding by computation the luminosity contributed by the other ingredient; and using in the neutral ingredient sufficient white to add luminosity thereto making up the requisite amount.

25. A multi-color iconograph comprising a body having a surface with spots representing different hues arranged around a neutral axis at angular distances apart according to the differences of wave length of their respective hues.

26. A multi-color iconograph comprising a body having a surface with spots representing different hues arranged around a neutral axis in the order and relative distance apart of the hues in the normal solar spectrum arranged with its ends overlapped to the degree giving brightest purple.

27. A multi-color iconograph comprising a body having a surface with spots representing different hues arranged around a neutral axis, and means to define the hues, comprising conventional indications arranged at uniform distances apart around a circle having its center at the neutral axis, and notation therefor signifying fractions of the complete circle.

28. An article representing the relations of colors to each other, comprising a body having a plane surface, said surface having spots whose positions indicate hues and strength, and circles and radii arranged at equal intervals around the spot of neutral hue.

29. The combination of a body having a plane surface with spots representing by their position colors of diverse qualities, points along a straight line joining any two spots representing combinations of color qualities differing from the combination represented by said spots according to their proportionate distances therefrom; and a body having a plane surface bearing parallel lines intersected by converging lines arranged on a scale of percentage between two of said converging lines, whereby the percentages into which a line joining two color spots is divided by any point on it are indicated by comparison of said divided line with said intersected parallel lines.

30. An article representing the relations of colors to each other, comprising a body having a plane surface with spots whose positions indicate hues and strength, the scale of hues comprising the hues of the solar spectrum arranged in angular progression around the neutral point; and notation defining a natural characteristic of the hue represented by a spot, whereby the scale of hues is fixed and independently determinable.

31. An article representing the relations of colors to each other, comprising a body having a plane surface with spots whose positions indicate hues and strength, the scale of strength comprising uniform gradations from the neutral point outward; and notation defining with certainty by natural laws a pigment having color qualities represented by a spot on the chart, whereby the scale of color quality is fixed and independently determinable.

32. A color chart comprising a sheet of material and a collection of spots fixed in locations thereon with reference to scales of color qualities, one of which is a scale of luminosity, such that the color of any spot when mixed with the color of any other spot produces a color having the qualities pertaining to that point on a straight line joining the two whose distances from said two spots are to each other inversely in the same ratio as the quantities of said colors in the mixture.

33. Apparatus to determine the synthetic proportions of three or more working colors to be mixed to make a desired color; said working colors being of differing luminosity, of great strength, and of hues widely separated from each other; comprising in combination said working colors and a chart having fixed upon it spots indicating by their respective positions the hues and strengths and indicia associated therewith indicating the luminosities of said working colors relative to each other according to scales of color qualities; whereby ingredients of any required one of a multiplicity of other colors are computable from the chart by measure and by application of mathematical laws, and said required color is producible from said working colors by mixing them or some of them together as ingredients in proportions thus computed.

34. Apparatus to determine the synthetic proportions of three or more working colors to be mixed to make a desired color; said working colors being of differing luminosity, of great strength, and of widely separated hues; comprising in combination said working colors and a chart having fixed upon it indicia of relative positions for said colors, such that any color located on the straight line between two of said indicated color positions may be produced by mixing together the working colors so positioned, said colors being each taken for mixing in ingredient quantity proportioned according to the fraction of said line which lies between the position thereon of the color that is to be produced and the working color at the other terminus of said line.

35. The art of making specific colors, in universal and infinite variety, which consists in predetermining relative positions on a chart at finite distances from each other of working ingredients, comprising white, black, and three or more colors of approximately permanent quality but of different hue; placing in said positions indications relative to the said ingredients; determining the position relative thereto of a specific color that is to be made; and making the said specific color by mixing together the several ingredients, or some of them, in measures of each according to the relation of positions thus determined.

36. The art of making specific colors, in universal and infinite variety, which consists in predetermining relative positions at finite distances from each other of working ingredients comprising white, black and three or more colors of approximately permanent quality but of differing hue; projecting their positions and the position of the required color upon a plane surface which is perpendicular to the line joining the positions of white and black; relating the position of the required color to others by drawing on said plane surface a line through it and the projection of white and an intersecting line through adjacent working colors positioned on opposite sides of said line through the projection of white; and making the required color by combining working colors joined by said line between working colors in quantities inversely proportional to their distance from said intersection, giving desired hue; with color of the same or opposite hue as that thus made, giving desired strength; and with neutral ingredient, giving desired luminosity, the whole required color being made by mixing said ingredients together and the measure of said ingredients being as computed by straight lines on said projection in respect of hue and strength, and by addition or subtraction of white from the luminosities of the quantities of said colors thus ascertained to make the required luminosity.

Signed by me at Boston, Mass., this eighth day of June, 1915.

ARTHUR HOWLAND.

Witnesses:
JOSEPH T. BRENNAN,
ANNA B. LINDSAY.